No. 12,093.

REISSUED MAR. 3, 1903.

J. C. WANDS.

SIDE BEARING.

APPLICATION FILED JAN. 8, 1903.

Witnesses:

G. A. Pennington

J. H. Gibbs

Inventor:

John C. Wands, by Bakewell & Cornwall

Attys.

UNITED STATES PATENT OFFICE.

JOHN C. WANDS, OF ST. LOUIS, MISSOURI.

SIDE BEARING.

SPECIFICATION forming part of Reissued Letters Patent No. 12,093, dated March 3, 1903.

Original No. 713,183, dated November 11, 1902. Application for reissue filed January 8, 1903. Serial No. 138,219.

*To all whom it may concern:*

Be it known that I, JOHN C. WANDS, a citizen of the United States, residing at St. Louis, Missouri, have invented a certain new and useful Improvement in Side Bearings, of which the following is a full, clear, and exact description, such as will enable others skilled in the art to which it appertains to make and use the same, reference being had to the accompanying drawings, forming a part of this specification, in which—

Figure 1:
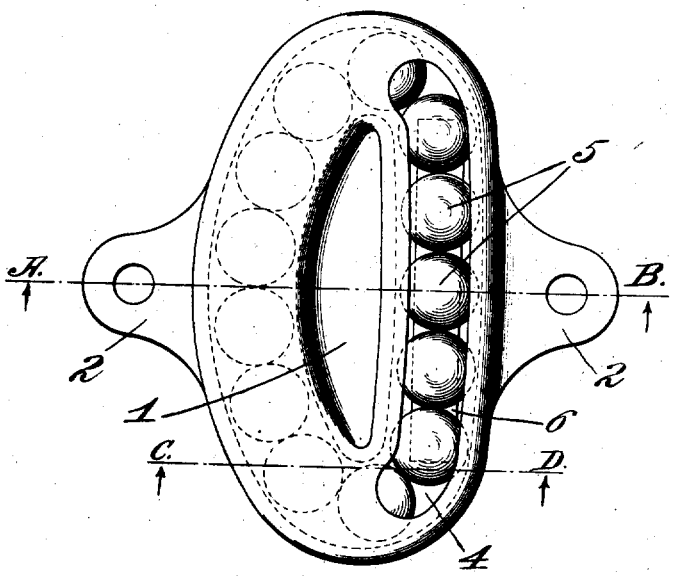
Figure 2:
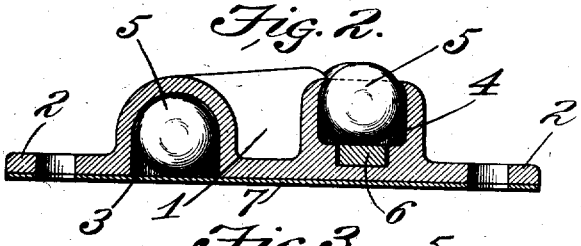
Figure 3:
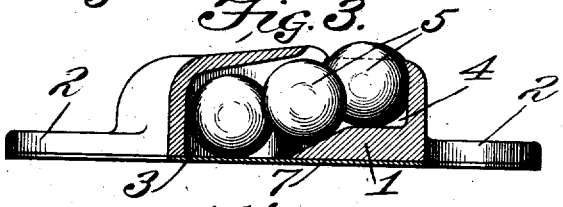
Figure 4:
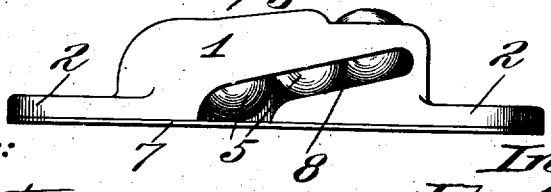

Figure 1 is a top plan view of my improved side bearing. Fig. 2 is a sectional view on the line A B, Fig. 1. Fig. 3 is a cross-sectional view on the line C D, Fig. 1; and Fig. 4 is an end elevational view.

This invention relates to a new and useful improvement in side bearings for railway-cars, being designed particularly for use in connection with street-cars, the object being to construct a device of the character described which will be simple, cheap, and effective in operation.

My present invention is an improvement upon the type of side bearing shown in United States Letters Patent to Alexander Richmond, No. 613,527, dated November 1, 1898, and resides in the provision of means for holding the balls in an endless race, the balls out of service being housed in; also, in the provision of means for getting rid of cinders or water which may tend to lodge in the race; also, in the provision of a hardened track-plate in the top race, whereby the balls in service or those subjected to the burden may ride upon a hardened track. Finally, the invention consists in the construction, arrangement, and combination of the several parts, all as will hereinafter be described, and afterward pointed out in the claims.

In the drawings, 1 indicates a casting, preferably made of malleable iron, which casting is provided with lugs or ears 2 for attachment to a bolster.

3 indicates a groove which opens through the bottom of the casting, said groove being housed over by the casting and connected by inclined ways with a groove 4, extending along the opposite side of the casting, said groove 4 opening through the top of the casting. The walls of this groove 4 converge toward each other at their upper edges, whereby the balls 5, arranged in said groove, are prevented from escaping.

6 indicates a track-plate dropped into a recess in the bottom of the groove 4, said track-plate being preferably straight, as shown in Fig. 1, on account of convenience in the manufacture thereof, while the groove 4, containing the upper row of balls, is curved, preferably on an arc of a circle described from the king-pin of the truck.

7 indicates a plate arranged under the casting, said plate forming the bottom wall of the groove 3, and upon which plate rest the balls of the lower row. The ends of the casting 1 are formed with openings 8, (see Fig. 4,) which openings are inclined, so that water may escape therefrom or dirt or cinders tending to lodge in the groove will be offered an avenue of escape and forced out by the movement of the traveling balls. It will be observed that this opening terminates at the bottom of the inclined end ways, and consequently cinders or dirt entering the groove 4 will be forced down the inclined way to the bottom thereof, and should any dirt be forced around the lower groove a reversed movement of the balls will not be liable to force said dirt up the inclined way, but will tend rather to force the same out.

The principle of operation is as follows: The upper row of balls are the ones in service, and they receive the load as transmitted by the bearing-plate on the body-bolster. When the body-bolster is in contact with this row of balls, the swinging of the truck as the car is rounding a curve will cause said balls to travel in their ways, the displacement of one ball from service by reason of the endless row of balls immediately placing another ball in service. There is no extra effort required to cause the balls to run up the inclined end ways, because movement in either direction will enable the end balls to counterbalance each other, and thus the only friction on the balls is a rubbing contact with the side walls of the ways, which amounts to practically nothing.

I am aware that minor changes in the construction, arrangement, and combination of the several parts of my device can be made and substituted for those herein shown and described without in the least departing from the nature and principle of my invention.

Having thus described my invention, what I claim as new, and desire to secure by Letters Patent, is—

1. A side bearing for railway-cars, the same consisting of a casting having grooves opening respectively through its bottom and top walls, inclined ways connecting said grooves, and balls; substantially as described.

2. In a side bearing for cars, the combination with a casting having diametrically opposite grooves opening to the top and bottom walls, said grooves being connected by inclined ways, a continuous row of balls in said grooves and inclined ways, and a bottom wall for the lower groove; substantially as described.

3. In a side bearing for cars, the combination with a casting formed with a continuous groove opening at opposite sides to the top and bottom, a continuous row of balls in said groove, and a removable track-plate inserted in the bottom of that side of the groove which opens to the top of the casting; substantially as described.

4. In a side bearing for cars, the combination with a casting having diametrically opposite grooves opening to the top and bottom, said grooves being connected by inclined ways, a continuous row of balls in said grooves and inclined ways, a bottom wall for the lower groove upon which the balls are supported, and a removable track-plate forming the bottom wall of the upper groove, upon which track-plate the balls are also supported; substantially as described.

5. In a side bearing for cars, the combination with a casting forming an endless way, one portion of said way being on a high plane, a continuous row of balls in said way, the casting being cut away to permit the row of balls in the high side of the way to protrude through the casting, and a removable plate arranged under the casting for supporting the balls on the low side of the way; substantially as described.

6. In a side bearing for cars, the combination with a casting provided with an endless way composed of a high side, a low side, and two inclined ends, a continuous row of balls in said way, the side walls of the high side of the way converging inwardly at their upper edges to embrace the balls, and a plate arranged under the casting and forming the bottom wall of the low side of the way; substantially as described.

7. In a side bearing for cars, the combination with a casting formed with an endless way, composed of a high side, a low side, and two connecting inclined ways at the ends, the end walls of the casting opposite the inclined ways being cut away, and a continuous row of balls in said ways; substantially as described.

8. In a side bearing for cars, the combination with a casting formed with a continuous way, said way being composed of a high and low portion connected by inclined end portions, walls opposite said inclined end portions being cut away so as to permit water and dirt to escape, a continuous row of balls in said way, and a bottom plate under the casting; substantially as described.

9. In a side bearing for cars, the combination with an endless way, of a continuous row of balls in said way, and means for permitting the escape of water, dirt, cinders, &c., in a lateral direction from said way; substantially as described.

10. In a side bearing for cars, a casting provided with an endless way composed of a high side, a low side, and inclined ends, of a continuous row of balls in said way, and an integral housing for the balls which are located in the low side of the way; substantially as described.

11. In a bearing, a casing formed integral and having a slotted ball-passage in which the balls are held and through the slot of which the balls project, said passage being continuous and having an opening through which the balls may be introduced, said opening being out of the line of movement of the balls in action.

12. In a side bearing for cars, the combination with a casting formed with an endless way having portions lying in different planes and connecting inclined portions, the portion of greatest elevation having a race-plate, of balls disposed in the way, said way at the ends of the race-plate having openings for the discharge of foreign matter and intercepting such matter in its passage to the race-plate.

In testimony whereof I hereunto set my hand, in the presence of two witnesses, this 24th day of December, 1902.

JOHN C. WANDS.

Witnesses:
G. A. PENNINGTON,
F. H. GIBBS.